G. F. DANIELSON.
SEAT FOR AGRICULTURAL MACHINES.
APPLICATION FILED NOV. 11, 1905.
909,874.
Patented Jan. 19, 1909.
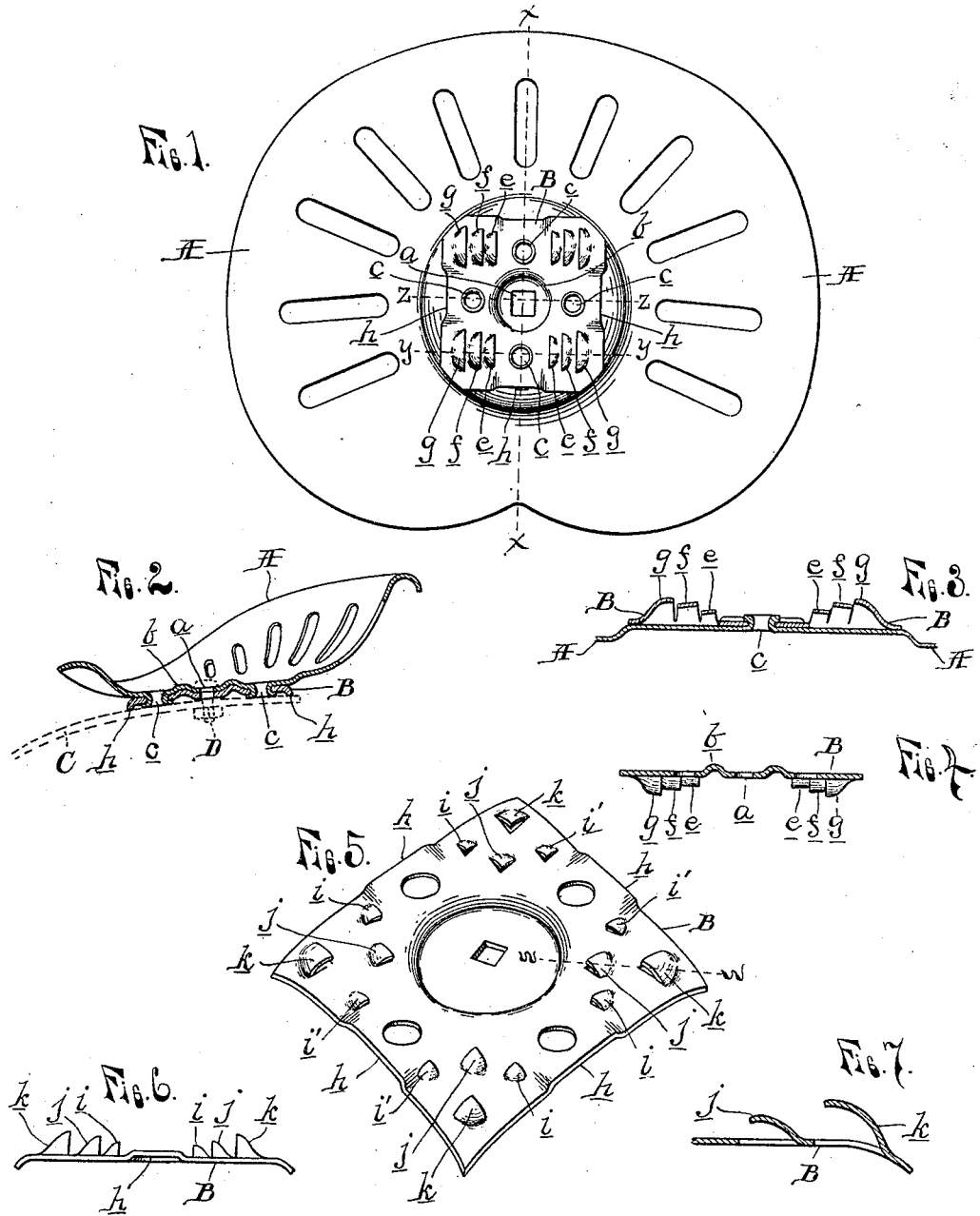
WITNESSES:
INVENTOR.
Gustave F. Danielson
BY
ATTORNEYS.

UNITED STATES PATENT OFFICE.

GUSTAVE F. DANIELSON, OF YOUNGSTOWN, OHIO.

SEAT FOR AGRICULTURAL MACHINES.

No. 909,874.   Specification of Letters Patent.   Patented Jan. 19, 1909.

Application filed November 11, 1905. Serial No. 286,838.

*To all whom it may concern:*

Be it known that I, GUSTAVE F. DANIELSON, a citizen of the United States of America, residing at Youngstown, in the county of Mahoning and State of Ohio, have invented certain new and useful Improvements in Seats for Agricultural Machines, of which the following is a specification, reference being had therein to the accompanying drawings.

This invention has special reference to a universal reinforcement plate for that class of seats which are made of sheet steel and are mounted upon spring bars and the invention consists in the novel construction of the reinforcing plate and of the part of the seat to which it is applied, with the object in view to make a light and strong seat and at the same time adapt the same seat to be mounted without any change of construction upon spring bars of different width, all as more fully hereinafter described and shown in the accompanying drawings, in which—

Figure 1, is a plan view of a seat of my construction as it appears looking at the underside thereof; Fig. 2, is a section on line $x$—$x$ Fig. 1 showing it as it appears in position when mounted upon a spring bar; Fig. 3, is a cross section on line $y$—$y$ in Fig. 1, the section being bottom side up same as in Fig. 1; Fig. 4, a section taken on line $z$—$z$ of Fig. 1 of the reinforcing plate alone, as in the actual position below the seat; Fig. 5, is a detached perspective view of a reinforcing plate of a modified construction, the view being that of its underside; Fig. 6, is an edge elevation of Fig. 5, and Fig. 7, is a cross section of one corner of the plate on line $w$—$w$ in Fig. 5.

In the drawings A is the seat, B is the reinforcing plate, C is the spring arm upon which it is mounted and D is the bolt which detachably secures the seat upon the spring arm. The seat is as usual made of a sheet of steel pressed into shape, it is made with a square hole $a$ in the center for the bolt to pass through and around this hole an annular corrugation $b$ is formed for the purpose of strengthening the seat around the bolt and to form a depression for the head of the bolt to lie in. The seat is further formed with a number of tubular rivets usually four which are integrally drawn from the material of the seat and project downwardly and form the means for securing the reinforcing plate to the underside of the seat.

The reinforcing plate B consists of a piece of sheet steel shaped to fit snugly against the underside of the seat it has a corresponding hole in the center for the seat bolt and corresponding holes for the rivets of the seat which pass through the holes and are headed upon the underside of the reinforcing plate. As the seat is secured upon the spring arm only by the single bolt D, means are provided to prevent the seat from turning upon this bolt and to this end I provide the reinforcing plate with projections upon its underside to confine the spring laterally and these projections I arrange upon a novel manner with the object in view to accommodate the seat to be fastened upon spring arms of different width.

As shown in Figs. 1–4 the projections are formed by cutting slits in the plate parallel to the longitudinal axis of the seat and then bulging out the severed portions of the plate to form four groups of projections $e\ f\ g$ in such manner that the projections $e$ will accommodate between them a spring arm of the smallest size in use, the next adjacent projections $f$ are made to project further out from the plate and accommodate a spring arm of the next larger size and the outermost projections $g$ are bulged out still further and accommodate between them a spring arm of the largest size in use which is ordinarily three inches wide. As the heads of the rivets $c$ slightly project below the bearing face of the reinforcing plate and would therefore give the smallest sized spring arm (which fits between the projections $e$) an insecure bearing on the plate, I bend a portion of the edges of the plate slightly out of line to form lips $h$ thereon in such a manner as to form bearings for the spring arm as more particularly shown in Fig. 2, in which the dotted lines represent a spring arm of the smallest size. The spring arm which fits between the projections $f$ has its bearing upon the projections $e$ and the one which fits between the projections $g$ has its bearings upon the projections $f$ and these spring arms thus have a secure bearing on the seat.

On account of the difference in the sizes of the spring arms used on different machines or by different makers of agricultural machines, the manufacturer of agricultural seats was obliged heretofore to make and keep in stock a separate seat for each size, but with my present invention I have done away with this as one seat can be used for any of the different sizes in use, which is a benefit to the manufacturer as well as the maker of agricultural machinery. There is yet another point involved in my invention and this lies in the adaptability of my seat to be mounted upon a spring arm which is secured transversely instead of longitudinally as in most of the agricultural machines.

It will be readily seen that a spring arm of suitable width may be secured transversely as well between the groups of projections, suitable lips h being also formed on the lateral edges of the reinforcing plate to form a bearing for each spring arm instead of letting them bear on the rivet heads which would not be quite so secure. There is this limitation however that but one size of spring arm could be used in the transverse direction, but by a modification in forming the projections on the reinforcing plate, I can provide a seat which is adapted to be mounted upon three sizes of spring arms in either the longitudinal or in the transverse direction of the seat. This modification shown in Figs. 5, 6 and 7, is in all essentials like the one shown in Figs. 1–4 except as to the projections which are in the form of triangular spurs of different sizes respectively of different height and arranged in a different manner. Thus the spurs $i$ $i'$ are of the least height and accommodate between them the smallest size of spring arm. There are two sets of these one $i$ for a longitudinal and the other $i'$ for a transverse spring arm, the spurs $j$ $j$ project further out and there is but one set adapted to accommodate a spring arm of the next largest size in either direction and the spurs $k$ project still further and the one set will accommodate the largest sized spring arms in either direction.

My invention thus broadly consists in providing a seat with a reinforcing plate which provides a universal adjustment for all sizes of springs or conditions of use, which permits the manufacturer in shipping out a car load of machinery comprising spring bars of assorted sizes, to ship only so many seats of one kind as there are spring bars and thus avoid confusion and mix up, as a result of having each seat fit but one size of supporting bar.

Having thus fully described my invention, what I claim is:—

1. A reinforcing plate for an agricultural seat provided upon opposite sides of its longitudinal center line with projections of varying height and of varying distances from said line corresponding to the different width of springs for the support of the seat, their height increasing with their distance from the center line, those having the same distance being of the same height.

2. A reinforcing plate for seats provided upon opposite sides of its longitudinal center line with projections of varying height and of varying distances from said line and adapted to accommodate between them spring arms of different width, said projections being arranged in sets of four of corresponding height and distance from the center line.

3. A reinforcing plate for a seat provided upon opposite sides of its longitudinal center line with projections of varying height and of varying distances from said line, and adapted to coöperate with each other in sets of four to accommodate spring arms of different width, said projections formed from portions of the plate partly severed therefrom on lines parallel to the longitudinal center line of the plate.

4. In an agricultural seat, the combination of a seat member and a reinforcing plate therefor, the seat member formed with tubular eyelets drawn from the metal of the seat member and the reinforcing plate formed with corresponding holes to receive said eyelets and secured to the seat member by heading the eyelets upon the underside of the reinforcing plate.

5. In an agricultural seat, the combination of a seat member formed with a central aperture for the securing bolt and with an annular corrugation around the same and forming a depression for seating the head of the bolt, a reinforcing plate provided with a corresponding bolt hole and a corresponding annular corrugation, means securing the seat member and reinforcing plate together and comprising tubular rivets drawn from the metal of the seat member and engaging in apertures of the reinforcing plate, projections formed of the reinforcing plate on opposite side of the longitudinal center line of the plate and adapted to prevent the seat from turning on the supporting spring, and lips formed at the edges of the reinforcing plate and adapted to hold a supporting spring arm out of contact with intervening parts.

6. In an agricultural seat, the combination of a seat member and a reinforcing plate secured to the underside of the seat member and provided with projections upon its underside of varying height and of varying distance from the longitudinal center line adapted to accommodate between them supporting bars of different width and prevent the seat member from turning thereon, said projections being formed in groups on opposite sides of the longitudinal center line by slitting the plate and depressing the metal on one side of the slits.

7. A reinforcing plate secured to the underside of the seat and provided upon its underside with sets of projections of graduated distances from both the longitudinal and the transverse center lines of the plate and of a graduated height according to their distances from said lines, said projections adapted to accommodate supporting bars of different sizes in both of said directions and prevent the seat from turning upon said bars.

In testimony whereof I affix my signature in presence of two witnesses.

GUSTAVE F. DANIELSON.

Witnesses:
  CHAS. B. CUSHWA,
  GEO. HIGGINS.